July 13, 1926.

M. F. SIMPSON

NUT TAPPING MECHANISM

Filed July 7, 1924    4 Sheets-Sheet 1

1,592,009

INVENTOR
MAX F. SIMPSON

Parker, Prochnow & Bean
ATTORNEYS

July 13, 1926.

M. F. SIMPSON

NUT TAPPING MECHANISM

Filed July 7, 1924 4 Sheets-Sheet 2

1,592,009

INVENTOR
MAX F. SIMPSON

Parker, Prochnow & Bean
ATTORNEYS

July 13, 1926.

M. F. SIMPSON

1,592,009

NUT TAPPING MECHANISM

Filed July 7, 1924    4 Sheets-Sheet 3

INVENTOR
MAX F. SIMPSON

Parker, Prochnow & Bean
ATTORNEYS

July 13, 1926.                    1,592,009
M. F. SIMPSON
NUT TAPPING MECHANISM
Filed July 7, 1924        4 Sheets-Sheet 4

INVENTOR
MAX F. SIMPSON

Parker, Prochnow & Bean
ATTORNEYS

Patented July 13, 1926.

1,592,009

UNITED STATES PATENT OFFICE.

MAX F. SIMPSON, OF KENMORE, NEW YORK.

NUT-TAPPING MECHANISM.

Application filed July 7, 1924. Serial No. 724,548.

This invention relates to improvements in mechanisms for tapping nuts or similar articles.

Heretofore in the manufacture of nuts from steel bars, the bars were fed to an automatic screw machine which finished the end of the bar, drilled a hole into the end of the bar, and then cut off the drilled end of the bar, thus forming nuts or nut blanks without threads. These unthreaded nuts were then discharged from the automatic screw machine and were placed by an operator into correct relation to a tapping mechanism.

One of the objects of this invention is to provide a mechanism which receives the nut blanks from a machine for forming the nut blanks and taps the same without necessitating any handling of the nut blanks. Other objects of this invention are to provide a mechanism of this kind which may be attached to an automatic screw machine and which cooperates with parts of the automatic screw machine to effect a feeding of the nut blanks directly from the automatic screw machine to the nut tapping mechanism; also to provide a mechanism of this kind in which the nuts are securely held during the tapping operation in such a manner that the axis of a tapping tool will at all times be at right angles to the opposite faces of the nut blanks; also to provide a mechanism of this kind which is timed to operate in unison with the machine for forming the nut blanks so that a nut blank is tapped while another nut blank is being formed; also to provide a nut tapping mechanism which is of strong and rugged construction and which is capable of operating indefinitely without attention other than lubrication and feeding of bars to the automatic screw machine; also to improve nut tapping mechanisms in other respects hereinafter specified.

The nut tapping mechanism embodying my invention which is shown in the accompanying drawings, is shown as applied to a Brown and Sharpe automatic screw machine and is adapted to cooperate with parts of this make of screw machines. It will be understood, however, that it is not intended to limit this invention to use in connection wth the Brown and Sharpe type of screw machines.

Figure 1:
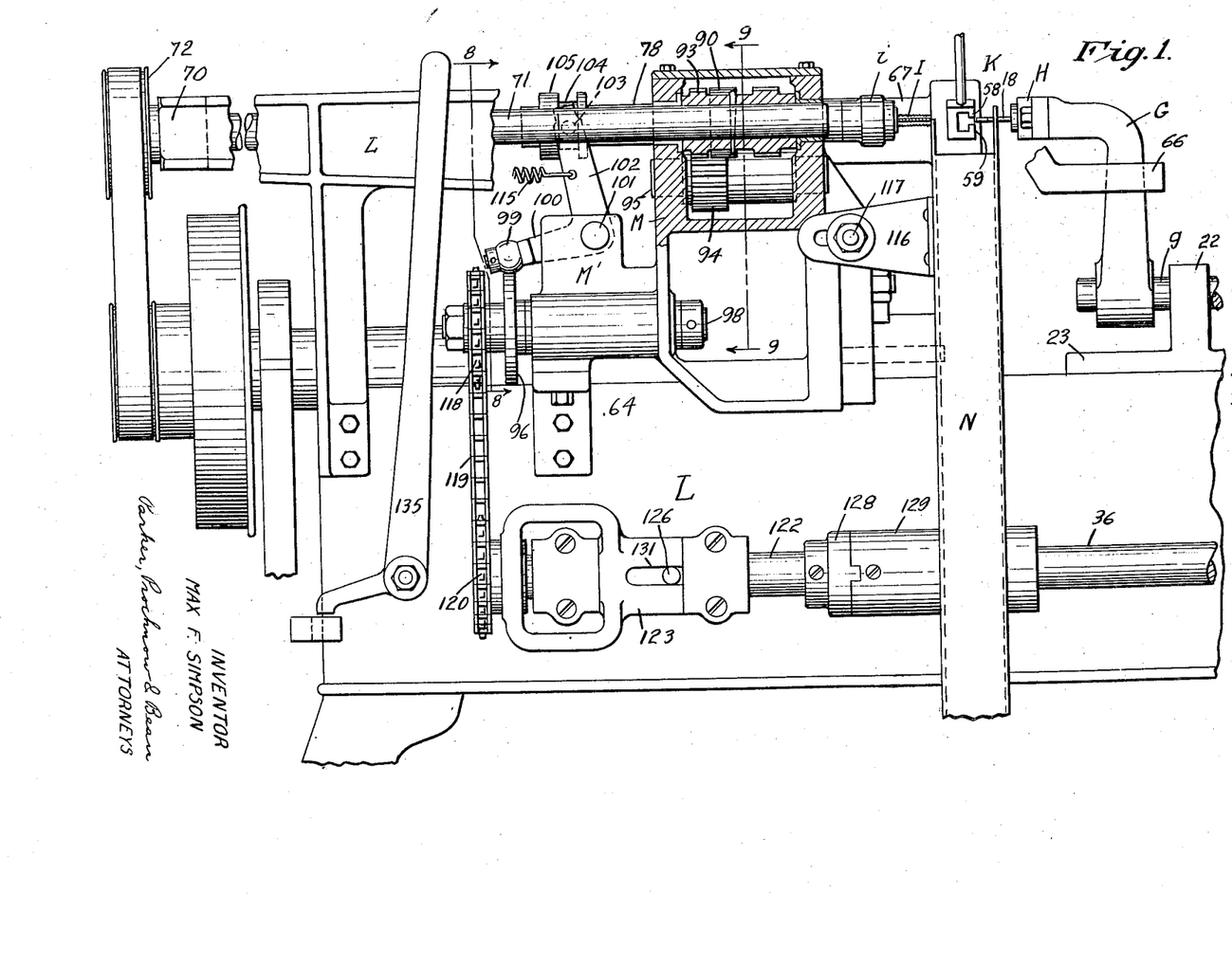
Fig. 1 is a front elevation thereof partly in section.
Figures 2, 3, 4:
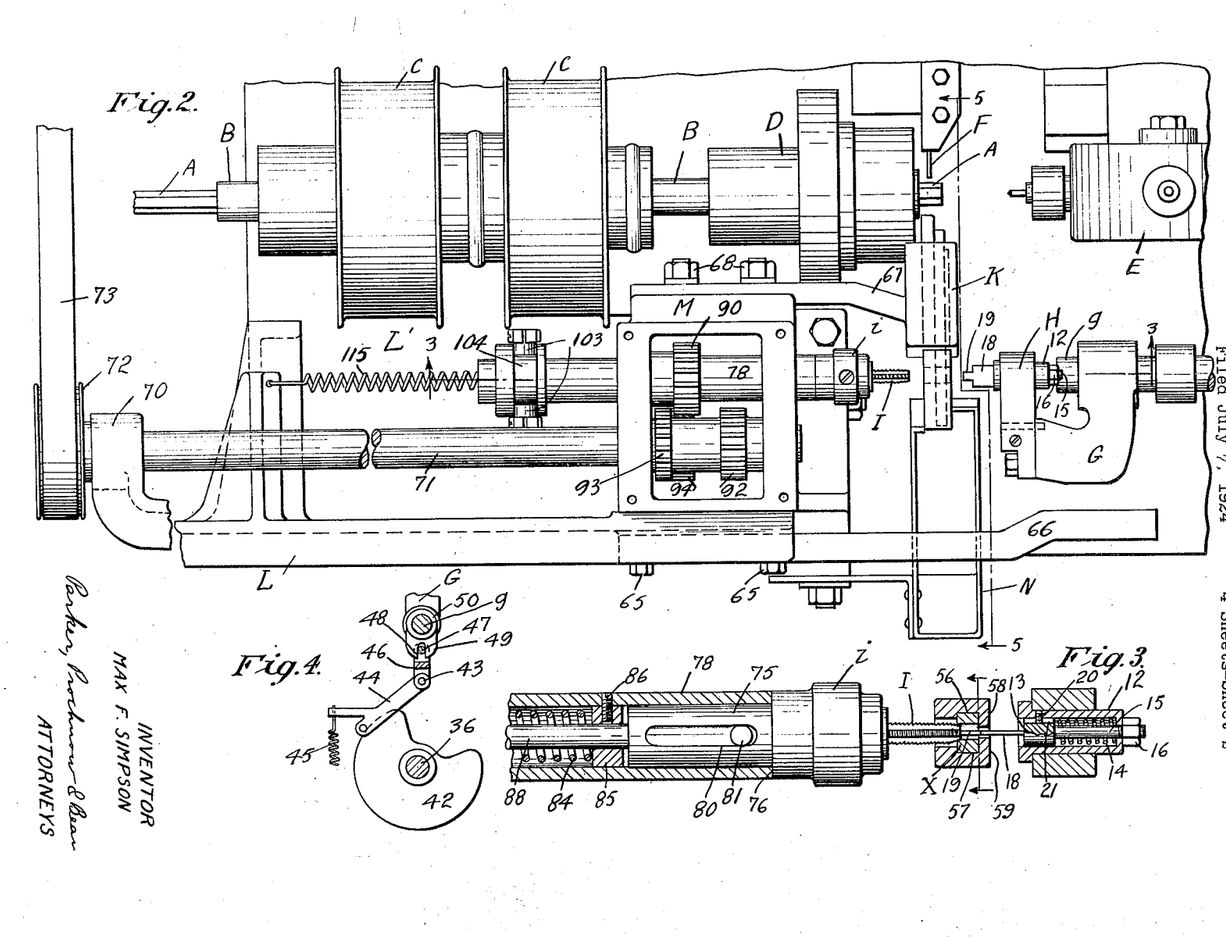
Fig. 2 is a top plan view of a nut tapping mechanism embodying my invention.
Fig. 3 is a fragmentary sectional elevation on an enlarged scale on line 3—3, Fig. 2.
Fig. 4 is a fragmentary sectional elevation thereof on a reduced scale on line 4—4, Fig. 10.
Figures 5, 7:
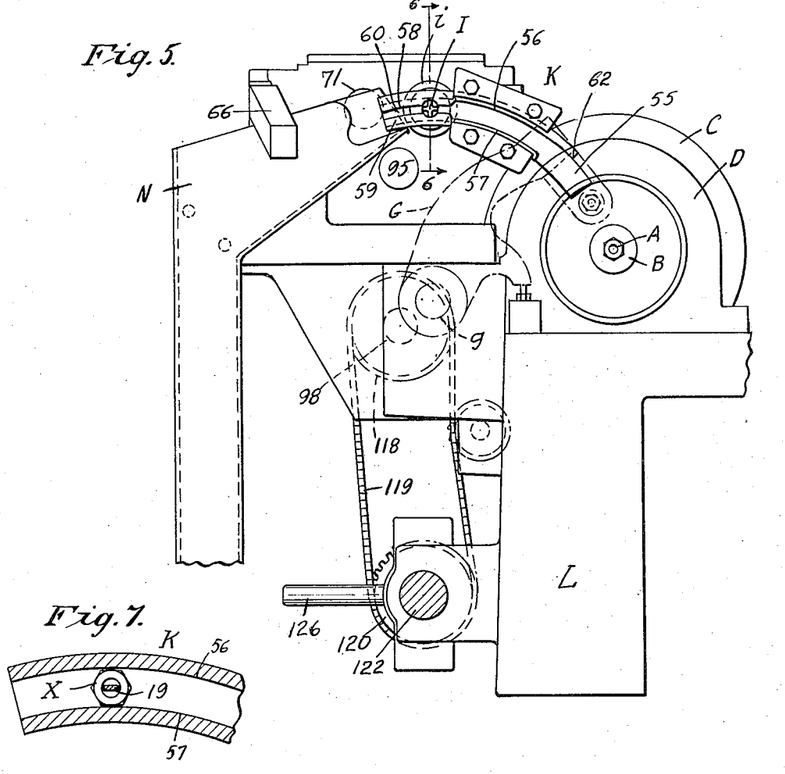
Fig. 5 is a transverse sectional elevation thereof on line 5—5, Fig. 2.
Fig. 7 is a fragmentary sectional detailed view on the line 7—7 of Fig. 3 of the part of the mechanism including the slots in which the nut blanks are held while being tapped.

Fig. 2 shows a part of the screw machine which holds the stock or bar from which the nut blanks are made. A represents the bar which, as shown, is of hexagonal cross section to form hexagonal nuts and this bar is inserted endwise into a hollow shaft B of the screw machine. C represents pulleys for imparting rotation to the hollow shaft B and D represents the housing of a holding or clutch mechanism which is provided with the usual means for gripping the bar A and holding the same in the rotating shaft B and also for advancing the bar at intervals through the hollow shaft. The end of the bar A is operated upon by the various tools in a turret E, which have heretofore been in use in connection with the forming of nut blanks. Generally the final operation performed by the turret is the drilling of a hole in the end of the bar, and after the hole has been drilled, the end of the bar A is cut off by means of a cutting tool F, thus completing the forming of the nut blank. It will be understood, of course, that the turret E and the cutting tool F as well as the clutch or bar advancing mechanism arranged in the part D are actuated automatically in the usual manner, all of these parts of themselves constituting no part of this invention.

After the end of the bar has been drilled and when the same is about to be cut off by the cutting tool F, an arm G swings into a position in which the end thereof is in aline- ment with the end of the bar and then moves toward the end of the bar in such a manner that a part of the arm enters into the hole in the end of the bar. Consequently when the end of the bar A has been cut off by the cutting tool F, the nut blank X thus formed will be supported by the arm G and this arm is also adapted to move the nut blank into operative relation to the tapping mechanism. The arm G which is normally a part of the automatic screw machine, is rigidly secured on a shaft $g$ which is adapted to oscillate and to move lengthwise as will be hereinafter explained. The outer or free end of the arm is provided with a laterally extending brack- et or part H, one end of which is rigidly secured to the outer end of the arm G and the other end is provided with suitable means for engaging the nut blanks and carrying the same from the automatic screw machine to the nut tapping mechanism. In the con- struction shown for this purpose, the exten- sion H is provided with a socket member 12 rigidly secured thereto and a plunger 13 is slidably arranged in the socket member 12, a spring 14 being interposed between the plunger 13 and the inner or closed end of the socket member 12. A pin 15 extends through the closed end of the socket member 12 and is held in operative relation thereto by means of a nut 16, or the like, which is arranged on the end of the pin 15 and limits the extent to which the spring 14 may move the plunger out of the socket member 12. Extending out of the socket member and be- yond the plunger 13 is a substantially flat bar or portion 18 which is adapted to carry the nut blanks and which is provided with a reduced end 19 which is adapted to enter into the hole in a nut blank X, the portions of the flat member 18 adjacent to the reduced portion 19 forming shoulders which limit the extent to which the reduced portion 19 may be inserted into the nut blank. A pin 20 secured in the socket member 12 and entering a slot 21 in the plunger 13 holds the plunger against turning relatively to the socket member.

The actuation of the shaft $g$ on which the arm G is rigidly mounted may be effected in any suitable or desired manner. In the construction shown, see particularly Figs. 4 and 10, the shaft $g$ is journalled in bearings 22 formed on a rigid part 23 of the frame of the screw machine, the shaft being so journalled in the bearings 22 that it may move lengthwise thereof as well as oscillate therein. The lengthwise movement of the shaft is effected by means of a bell crank lever pivoted at 25 and having an arm 24 provided with projections 27 engaging a collar 28 which is rigidly secured to the shaft $g$. A spring 29 is interposed between the collar 28 and one of the bearings 22 and normally holds the collar 28 against the arm 24 of the bell crank lever and thus tends to move the shaft $g$ to the right in Fig. 10. The other arm 30 of the bell crank lever co- operates with a cam 31, which produces the desired movement of the bell crank lever about its pivot 25 to impart the longitudinal movement to the shaft $g$ to the left in Fig. 10 against the action of the spring 29, the spring effecting the movement of the shaft in the other direction when permitted by the cam. The cam 31 in the construction shown is mounted on a shaft 33 on which a beveled gear 34 is also mounted and this beveled gear meshes with a corresponding beveled gear 35 arranged on a shaft 36, driven by means of a worm wheel 37 from a worm 38. This worm is secured on a shaft 39 which is driven in any suitable manner from the automatic screw machine.

Figure 10:
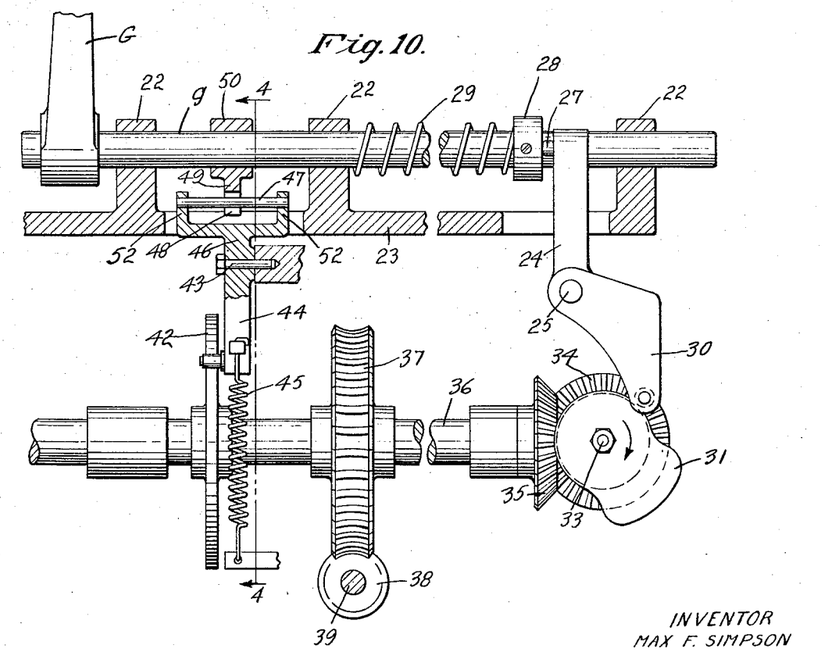
Fig. 10 is a sectional elevation of a part of an automatic screw machine showing the mechanism for moving the arm which carries the nut blanks from the screw machine to the tapping mechanism.

The shaft 36 is also provided with a cam 42 which imparts the oscillatory movement to the shaft $g$. The cam 42 cooperates with a bell crank lever pivoted at 43 on a fixed part of the machine and having an arm 44 which engages with the face of the cam 42, a spring 45 being provided to hold the arm 44 in engagement with the face of the cam. The other arm 46 of the bell crank lever is provided adjacent to its upper end with a pin 47 adapted to operate in a slot 48 ar- ranged in an arm 49 formed integral on a sleeve or collar 50 rigidly secured on the shaft $g$. The pin 47 is long enough to per- mit the arm 49 to move lengthwise during the axial movement of the shaft $g$ without moving out of engagement with the slot in the arm 49 and for this purpose the ends of the pin are secured in the ends of a forked end portion 52 formed on the arm 46 of the bell crank lever. Consequently by means of this construction the pin 47 may cause an oscillating or swinging movement of the shaft $g$ in any position of the shaft during its axial or longitudinal movement. Any other means for imparting the axial and longitudinal movements to the arm $g$ may be provided if desired.

I represents a tap or tapping tool which is suitably secured in a chuck or tool holder $i$ of any suitable or desired construction, the axis of the tap I extending parallel to the axis of the hollow shaft or sleeve B into which the bar A of the nut stock is intro- duced. By means of the mechanism which has been described the arm G moves into op- erative relation to the end of the bar A at about the time the nut is being cut there- from and the nut as soon as it is severed from the bar A is received on the reduced end 19 of the nut blank holder or carrier of the arm G. The arm G is swung about its axis in such a manner as to bring the nut blank into axial alinement wth the tap I and a nut holding and positioning member K cooperates with the nut blank carrying device on the arm G to insure a proper positioning of the nut relatively to the tap I and also to hold the nut against turning while being tapped. Any suitable means may be provided for thus holding and guiding the nut blank, the device K shown in the accompanying drawings being constructed as follows:

The nut blank guide and holding member K is suitably mounted on the frame of a nut tapping mechanism as will be hereinafter explained and includes a projecting portion 55 having a flat face which is adapted to engage with the face of the nut blank X which has just been severed from the bar A and serves to hold the nut on the nut carrying projection 19 during the swinging of the arm G. After a short movement of the arm, the nut is passed between a pair of shoulders or walls 56 and 57 extending outwardly from the flat face which engages the face of the nut blank and which engage two opposite flat sides of the nut blank in such a manner as to hold the same in correct relation to the tapping mechanism. Upon a further movement of the nut blank by means of the arm G the blank passes between a pair of ledges 58, 59 which extend inwardly toward each other from the outwardly extending flanges or parts 56, 57, preventing the nut from being moved backwardly when engaged by the tap. The two inwardly extending flanges 58 and 59 form between them an arc shaped slot 60 into which the flat portion 18 of the nut blank carrying device may enter in positioning the nut blank in operative relation to the tap. The nut blank is preferably presented to the nut blank guiding and holding device K in such a way that two parallel flat faces of the nut blank must engage the opposite side walls 56, 57 of the nut blank guiding devce. In order to insure proper positioning of the nut blanks, one of the side walls, for example the wall 56 extends somewhat beyond the other wall and is provided with a face or corner 62 whch is adapted to strike a corner of a nut blank, should the blank be presented in an incorrect position, and turn the nut blank on its carryng pin 19 so that two parallel flat faces of the nut blank must engage the side walls 56 and 57. Any other guide means may be provided for guiding the nut blanks into correct relationship to the tap and for holding the same against turning while acted upon by the tap.

The nut tapping mechanism is provided with a frame member L of any suitable construction, which is rigidly secured to the frame member L' of the automatic screw machine and M represents a gear housng which is provided with an extension M' which rests upon an angle bar or shoulder 64 secured to the frame L' of the screw machine, the frame L and the gear housing M being suitably secured together by means of bolts 65 or the like. In the construction shown, these bolts preferably also secure a stop bar 66 to the frame of the machine, the end of the stop bar being adapted to form a stop for the swinging arm G which carries the nut blank from the screw machine to the nut tapping mechanism, and insures the stopping of this arm in a position in which the hole in the nut blank is in axial alinement with the tap. The nut blank guiding and holding device K has a rearwardly extending arm 67 which is secured by means of bolts or nuts 68 to the gear housing or box M. The frame member L is preferably also provided with a curved end portion 70 provided with a bearing for a shaft 71 which supplies power to the tapping tool the shaft 71 being provided at its outer end with a pulley 72 which may be driven by a belt 73. The other end of the shaft 71 is journalled in the gear housing or box M. Any other means for rotating the shaft 71 may, of course, be employed and the frame members for supporting the several parts of the nut tapping mechanism may be of any other desired construction.

The tap I must be driven first in one direction to tap the hole in the nut blank and then in the other direction to release the tap from the nut. Mechanism of any desired construction for causing rotation of the tap I in opposite directions and for moving the tap lengthwise toward and from the work may be provided, those shown in the accompanying drawings being constructed as follows: The chuck or holder i for the tap I is provided with a rearwardly extending shank 75 of reduced diameter, forming an annular shoulder 76 with chuck i. This shank 75 is held in a rotatable tube or sleeve 78. the tube shown being substantially circular in cross section and being journalled in suitable bearings formed in the walls of the gear housing or box M. The shank 75 of the chuck is so connected with the tube 78 that the chuck will rotate with the tube and may move endwise relatively to the tube. In order to permit this movement, the shank 75 is provided with a slot 80 through which a pin 81 extends, the ends of the pin being secured to the tube 78. Means are preferably provided for normally holding the chuck shank 75 in its inner position in the tube, in which position the shoulder 76 of the chuck will engage the ends of the tube 78. For this purpose in the construction shown, a spring 84 is provided, one end of which abuts against a suitable stop 85 secured in the tube 78, the stop shown being in the form of an annular collar, held in place by means of a set screw 86. The other end of the spring abuts against a shoulder or disk 87 formed on or secured to the end of a rod 88, the other end of which is rigidly secured to the shank 75 of the chuck $i$, the rod 88 preferably extending lengthwise through the coil spring 84. This spring 84 will normally hold the chuck $i$ against the end of the tube or sleeve 78 but will permit the chuck to move away from the tube to the extent of the length of the slot 80.

The chuck carrying sleeve or tube 78 is provided with a gear 90 rigidly mounted thereon and arranged within the gear case M. Rotation in opposite directions is imparted to the chuck carrying tube 78 by moving the tube in the direction of its length so that the gear 90 thereon may engage with either one of two gears revolving in opposite directions. For this purpose a gear 92 is mounted on the shaft 71 in the gear box M and adapted to be rotated in a direction to move the tap into the nut blank to affect the tapping thereof and consequently when the chuck carrying tube 78 is moved in a direction to cause the gear 90 to mesh with the gear 92, the chuck carrying tube will be driven in a direction to cause the nut blank to be tapped. The shaft 71 within the gear housing M is also provided with another gear 93 which meshes with a gear 94 arranged on a counter shaft 95 which is also journalled on the gear housing M. This gear 94 consequently is driven in the opposite direction from the gears 93 and 92 and is so arranged that when the chuck carrying tube 78 is moved in a direction to draw the tap out of the nut, the gear 90 carried by the tube 78 will mesh with the gear 94, thus causing the tube 78 to be driven in the reversed direction, so that the tap is screwed out of the nut X.

The means for moving the chuck carrying tube 78 in the direction of its length to place the gear 90 thereon into engagement with either of the gears 92 or 94, is preferably affected by means of the following mechanism.

Figure 6:
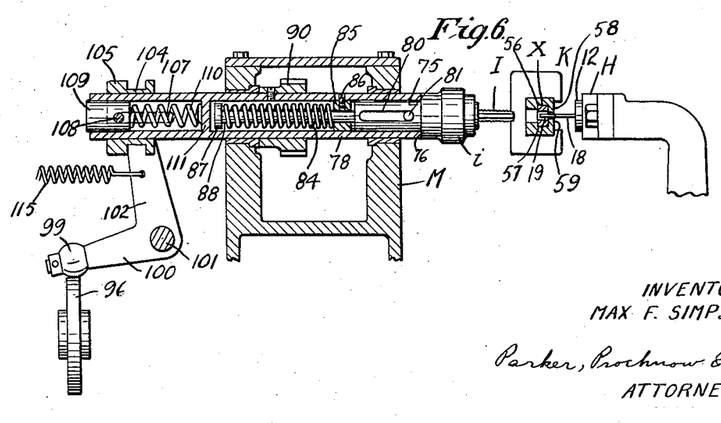
Fig. 6 is a fragmentary sectional elevation thereof on line 6—6, Fig. 5.
Figure 8:
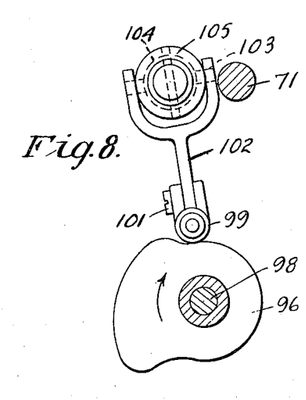
Fig. 8 is a transverse sectional elevation thereof on line 8—8, Fig. 1.
Figure 9:
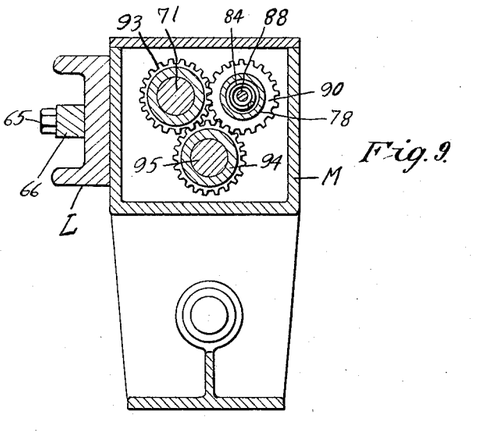
Fig. 9 is a fragmentary transverse sectional elevation thereof on line 9—9, Fig. 1.

A cam 96 is arranged on a counter shaft 98 suitably journalled in a bearing formed in the extension M' of the gear housing M and this cam cooperates with a roller 99 arranged on an arm 100 of a bell crank lever which is pivoted at 101 on the extension M' of the gear housing M. The other arm 102 of the bell crank lever is bifurcated and the bifurcated portion thereof is provided with pins or trunnions 103 which are adapted to enter into an annular groove 104 formed in a collar 105 which is arranged on the chuck supporting sleeve or tube 78. The collar 105 preferably rotates with the tube 78 and is also movable lengthwise thereof and for this purpose the tube 78 is provided with longitudinal slots 107 through which a pin 108 extends the ends of said pin being secured on the sleeve 105. The pin 108 also extends through a plunger 109 which is slidable lengthwise in the tube 78 and which engages with one end of a spring 110, the other end of which engages an abutment or stop 111 in the chuck carrying tube 78. Consequently when the bell crank lever swings in a direction to move the chuck carrying tube 78 to the right in Fig. 6, the tap I will be yieldingly pressed against a nut blank owing to the fact that the spring 110 is interposed between the positively moved plunger 109 and chuck supporting tube 78.

A spring 115 connecting the arm 102 of the bell crank lever and a fixed part of the frame of the tapping mechanism tends to draw this lever in a direction to withdraw the tap from the nut and also to hold the roller 99 in engagement with the cam 96. Consequently at the end of the tapping operation the spring 115, cooperating with the cam 96 swings the bell crank lever in a direction to move the chuck supporting tube 78 to the left in Fig. 2 and thus move the gear 90 of the chuck carrying tube out of engagement with the gear 92 and into engagement with the gear 94, thus causing the chuck carrying tube 78 to be rotated in the reversed directions, to withdraw the tap from the nut. Since, however, the nut is confined within the holding device K, the tapping device cannot be immediately withdrawn therefrom and consequently the tube 78 moves away from the chuck $i$, compressing the spring 84, the chuck continuing to receive its turning movements from the chuck carrying tube 78 through the medium of the pin 81 and the slot 80 in the shank 75 of the chuck. As soon as the tap has been completely released from the threads in the nut, the spring 84 returns the chuck $i$ to the position in which the shoulder 76 thereof engages the end of the chuck carrying tube 78. The nut blank tapping mechanism is then ready to receive another nut blank and when the arm G carries the next nut blank into operative relation to the tap I in the nut blank positioning and holding device K the nut blank will push the tapped nut out beyond the end of the slot in the nut positioning and holding device K and discharge the same into a magazine or chute N. This chute may be mounted on the frame of the nut tapping mechanism in any suitable manner, a bracket 116 being provided for this purpose in the construction shown, which is secured on the gear housing M by means of a bolt or screw 117 extending through a slot in the bracket 116 to permit adjustment of the chute relatively to the nut discharge end of the guiding and holding device K. The rotation of the shaft 98 on which the cam 96 is mounted may be effected in any suitable or desired manner. In the construction shown for this purpose the shaft 98 is provided with a sprocket wheel 118 which cooperates with a sprocket chain 119, which is driven by means of a sprocket wheel 120 arranged on the end of a shaft 122, which is suitably journalled in bearings formed on a bearing supporting member or frame 123. The shaft 122 has a suitable splined connection with the sprocket wheel 120, this connection not being shown, which permits a small amount of movement of the shaft 122 lengthwise with reference to the sprocket wheel 120, the movement being effected by means of a shift lever or rod 126. The end of the shaft 122 is preferably provided with a clutch member 128 adapted to engage a corresponding clutch member 129 formed on the end of the shaft 36. By actuating the shift lever or rod 126 in its guide slot 131, the clutch member 128 may be disconnected from or connected with the clutch member 129. By means of this connection the tapping mechanism may be rendered inoperative in case it is desired to use the automatic screw machine for other purposes. By driving the cam 96 which causes the moving of the tapping device I toward and from the nut blanks, from the shaft 36 which forms a part of this automatic screw machine, the operation of the nut tapping mechanism in synchronism with the automatic screw machine is assured. 135 represents a control lever for controlling the operation of the automatic screw machine in the usual manner.

The nut tapping mechanism described is particularly desirable for the reason that it may be attached to a machine for forming the nut blanks and cooperate therewith in such a manner that the nut blanks will be tapped without further handling or manipulation thereof by any employee. By automatically presenting the nut blanks in operative relation to the tapping device I by means of the guide and holding device K, a correct tapping of all of the blanks is assured since the slot or channel in the guiding and holding device K in which the nuts are held is just large enough to receive the nuts and to hold them in their correct relation to the tap. The mechanism is simple of construction and involves the use of no parts which are subject to excessive wear.

I claim:—

1. The combination with a machine for forming nut blanks from a bar, of a nut tapping mechanism, and a swinging arm movable back and forth in an arc of a circle and adapted to receive a nut blank from said machine while a nut blank is being cut from a bar and to carry the same into a position to be acted upon by said tapping mechanism.

2. The combination of a machine for drilling the end of a bar and cutting off the drilled end of said bar to form a nut blank, tapping mechanism, and a swinging arm movable back and forth and having a part adapted to engage a nut blank while the same is being cut from a bar and to carry the same into operative relation to said tapping mechanism.

3. The combination with a machine for forming nut blanks, of a nut tapping mechanism, and a member movable back and forth between said blank forming machine and said tapping mechanism and having a part adapted to enter into the hole in a nut blank while the blank is being formed to carry said nut blank from said forming machine into operative relation to said tapping mechanism.

4. The combination with a machine for forming nut blanks, of a nut tapping mechanism, and a member movable back and forth between said blank forming machine and said tapping mechanism and having a yielding part adapted to enter into the hole in said nut blank and to carry said nut blank from said forming machine into operative relation to said tapping mechanism, said yielding part being moved out of said hole when a part of said tapping mechanism enters said hole.

5. The combination with a machine for forming and cutting off nut blanks from a bar, of a nut tapping mechanism including a tap, a holding device for holding said nut in operative relation to said tap, and means entering into the hole in the nut blank during the cutting off thereof for moving a nut blank from said nut blank forming machine to said holding device.

6. The combination of a machine for drilling and cutting off nut blanks from a bar, a tapping mechanism, and means adapted to enter the hole drilled in a nut blank while the same is being cut off and to carry the nut blank to said tapping mechanism.

7. The combination of a nut tapping mechanism, a source of supply of nut blanks, a member movable back and forth between said source of supply and said tapping mechanism and adapted to enter into the hole in a nut blank and carry the same into tapping position, and guide means cooperating with a movable member for positioning said nut blank in correct relation to said tapping mechanism.

8. The combination of a nut tapping mechanism, a source of supply of nut blanks, a member movable back and forth between said source of supply and said tapping mechanism and adapted to enter into the hole in a nut blank and carry the same positively into operative relation to said tapping mechanism, and means adapted to engage a nut blank when the same is placed into operative relation to said tapping mechanism by said movable member to hold said nut blank against turning while acted upon by said tapping mechanism.

9. The combination of a nut tapping mechanism, a source of supply of nut blanks, a nut blank guiding and holding device extending into operative relation to said nut tapping mechanism and extending in proximity to said supply of nut blanks, said guiding and holding device being of substantially tubular form and adapted to engage two opposite sides and both faces of a nut and having a slot in one side and a hole in the opposite side through which a tapping tool may pass, and a device adapted to extend through said slot for carrying the nut blanks into said tubular device and for holding the same opposite said hole against movement in either direction therein until engaged by said tapping tool.

10. The combination of a nut tapping mechanism, a source of supply of nut blanks, a nut blank guiding and holding device extending into operative relation to said nut tapping mechanism and extending in proximity to said supply of nut blanks and made of a single piece of material having a portion adjacent to said tapping mechanism which is of U-shaped cross section and includes a base adapted to engage an entire face of a nut, flanges extending outwardly from said base and adapted to engage opposite sides of a nut, and holding flanges extending toward each other from the ends of said outwardly extending flanges and adapted to engage the opposite face of a nut, and means extending between said holding flanges for carrying nut blanks from said source of supply to said tapping mechanism.

11. The combination of a nut tapping mechanism, a source of supply of nut blanks, a nut blank guiding and holding device extending into operative relation to said nut tapping mechanism and extending in proximity to said supply of nut blanks and including a slotted portion adapted to engage opposite faces of the nut blank and opposite flat sides thereof for holding a nut blank in operative relation to said nut tapping mechanism for holding the nut blank against turning, and means extending into the hole in a nut blank for moving nut blanks from said source of supply into said slotted portion.

12. The combination of a nut tapping mechanism, a source of supply of nut blanks, a nut blank guiding and holding device extending into operative relation to said nut tapping mechanism and extending in proximity to said supply of nut blanks and including an open ended slot adapted to receive a nut blank at one end thereof and to discharge a nut at the other end, said slot being formed to engage opposite faces and opposite flat sides of a nut blank when the same is in operative relation to said nut tapping mechanism, and a device entering into the hole in a nut blank for feeding a nut blank from said source of supply to said slot, said device being moved out of the hole in the nut blank by a tapping tool entering said hole.

13. The combination of a machine for drilling and cutting off nut blanks from a bar, a tapping mechanism including a tapping tool, means adapted to enter the hole drilled in a nut blank while the same is being cut off to carry the nut blank to said tapping mechanism, and means for permitting said carrying means to withdraw from the hole in a nut blank when the tapping tool enters said hole.

14. The combination of a nut tapping mechanism a source of supply of nut blanks, a nut blank guiding and holding device including an open-ended slot, the receiving end of which extends into proximity of said source of supply of nut blanks and which has portions adapted to engage a side of a nut blank to hold the same against turning when said nut blank is being tapped, means for feeding a nut blank from said source of supply into said slot, and means on the receiving end of said slot for turning a nut blank on its axis into a position in which opposite flat sides of a nut blank are arranged in correct relation to said slot.

15. The combination of a nut tapping mechanism, a source of supply of nut blanks, a nut blank guiding and holding device extending into operative relation to said nut tapping mechanism and extending in proximity to said supply of nut blanks and including a curved slot into which the nut blanks are adapted to enter and which is formed to hold said nut blanks against turning when acted upon by said tapping mechanism, a pivoted swinging arm having a part adapted to receive a nut blank from said source of supply and to positively move the same into and through said curved slot lengthwise thereof into operative relation to said nut tapping mechanism.

16. The combination of a nut tapping mechanism including a tap, a source of supply of nut blanks, a guiding and holding device for nut blanks including a slot in which said nut blanks are adapted to be moved into operative relation to said tap, means on said guiding and holding device for holding said nut blanks against movement while being tapped, and a part movable from said source of supply to said tapping mechanism and including a resilient part adapted to enter into the hole of a nut blank and adapted to be moved out of said hole by said tap when the same enters said hole.

17. The combination of a nut tapping mechanism including a tap, a source of supply of nut blanks, a member movable from said source of supply to said tapping mechanism and having a part adapted to enter a hole of a nut blank to carry the same to said tapping mechanism, and means for holding a nut blank when the same is positioned in operative relation to said tap, said part entering into the hole in the nut blank being resiliently held in said hole and being adapted to be moved out of said hole by said tap when the same enters said hole.

18. The combination with a source of supply of nut blanks, of a nut tapping mechanism and a member movable back and forth between said source of supply and said tapping mechanism, and having a part adapted to enter into the hole in a nut blank and carry a nut blank from said source of supply to said tapping mechanism, said part being adapted to be moved out of said hole by a part of said tapping mechanism entering the hole.

19. The combination of a nut tapping mechanism and a member adapted to feed nut blanks to said tapping mechanism, and including a part which is adapted to enter lengthwise into the hole in a nut blank and then to move laterally for carrying the nut blank into operative relation to the tapping mechanism.

20. The combination of a nut tapping mechanism, a source of supply of nut blanks, a nut blank guiding and holding device including an open ended slot having oppositely arranged walls adapted to engage opposite sides of a nut blank for holding the same against turning when the nut is being tapped, means adapted to enter the hole in a nut blank for feeding the same from said source of supply into said slot, one of the walls of said guiding device extending toward said source of supply to a greater extent than said other wall to engage the nut blank to turn the same on said feeding means to arrange opposite faces of said nut blank in correct relation to the side walls of said slot.

MAX F. SIMPSON.